Findlay & Craig,
Hay Press;
No. 111,923. Patented Feb. 21, 1871.
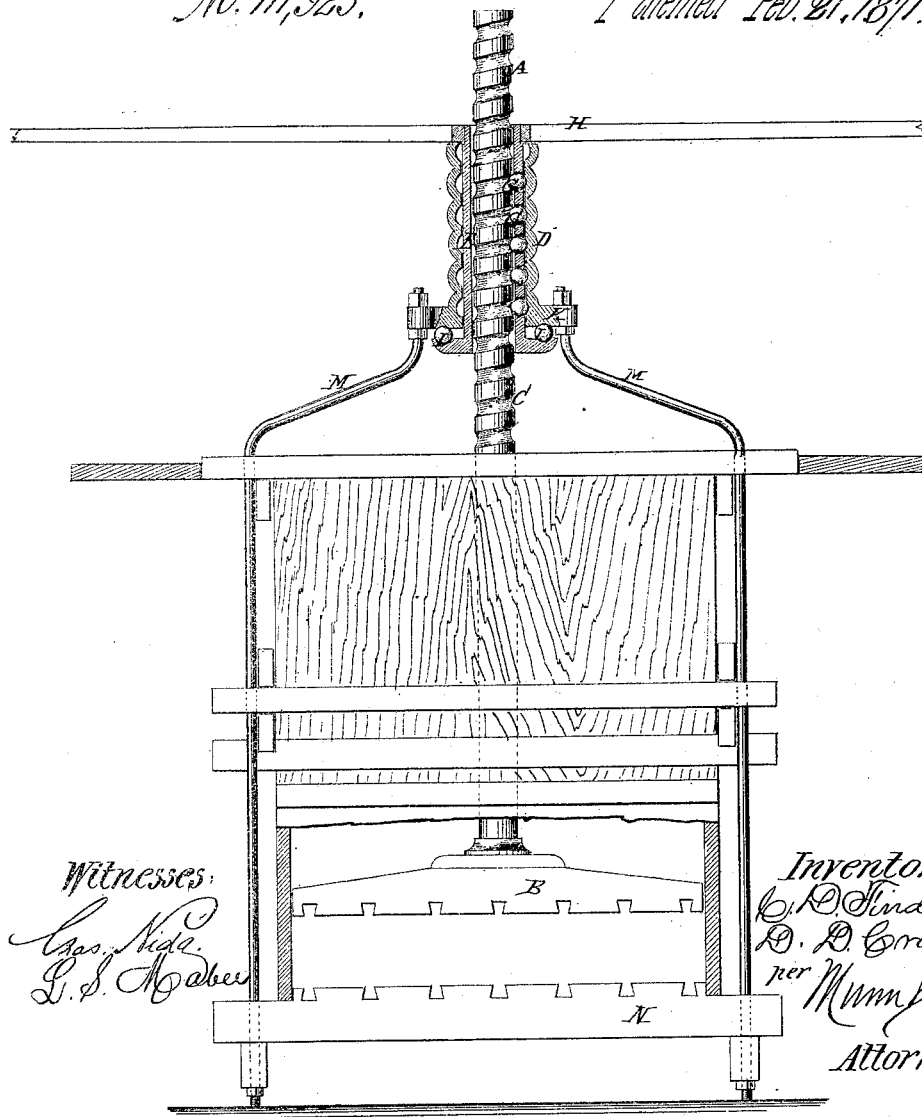
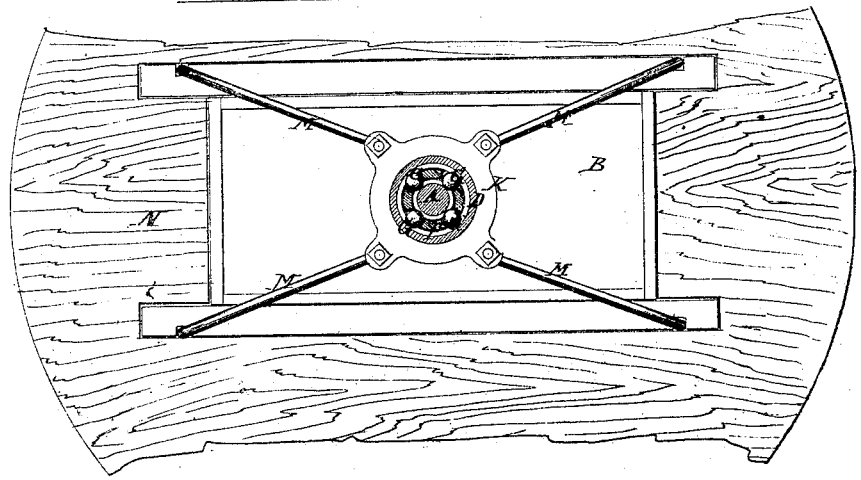
Witnesses:
Geo. Nida
L. S. Maber
Inventor:
C. D. Findlay
D. D. Craig
per Munn & Co
Attorneys.

United States Patent Office.

CHRISTOPHER D. FINDLAY AND DAVID D. CRAIG, OF MACON, GEORGIA.

Letters Patent No. 111,923, dated February 21, 1871.

IMPROVEMENT IN PRESSES FOR HAY, COTTON, &c.

The Schedule referred to in these Letters Patent and making part of the same.

*To all whom it may concern:*

Be it known that we, CHRISTOPHER D. FINDLAY and DAVID D. CRAIG, of Macon, in the county of Bibb and State of Georgia, have invented a new and useful Improvement in Presses; and we do hereby declare that the following is a full, clear, and exact description thereof, which will enable others skilled in the art to make and use the same, reference being had to the accompanying drawing forming part of this specification.

This invention relates to improvements in presses for hay, cotton, and other like substances, and consists in a combination, with a screw and nut for working the follower, of anti-friction balls for reducing the friction.

It also consists in a combination, with the nut and nut-holder, of anti-friction balls under an arrangement calculated to relieve the friction of the end-thrust.

Figure 1 is an elevation, partly in section, of our improved press; and

Figure 2 is a horizontal section of the same.

Similar letters of reference indicate corresponding parts.

The screw A for working the follower B is provided with a concave groove, C, to form the thread, and, instead of the ordinary nut for turning it, a fixed tube, D, having the annular grooves E in the inner wall, is provided, also the rotary tube F and the balls G.

The tube F is arranged between the screw and the fixed tube D, and the balls are placed in holes through it so that one side will bear in the groove C and the other in one of the grooves E.

This tube F is connected at the upper end with the sweeps H for being turned, and being held against end movement causes the balls to move the screw by their action in the groove C, as will be clearly seen by inspection of the drawing.

The lower end of tube F is provided with a flange, I, which has a groove in the upper face, above which is another groove in the lower face of the flange K of the fixed tube, and a set of balls, L, is placed in these grooves to relieve the end-thrust on the screw.

The tube D is supported, in this example, by the bent rods M rising up from the bed N through the top of the frame of the press, so as to take the strain between the nut and the bed; but it may be done in any approved way.

These anti-friction balls very greatly lessen the friction, as will be clearly seen, and the construction is very simple and cheap.

We may use cast-steel or cast-iron balls, as may be found best, the same being chilled to make the surface more durable.

The screw and the tubes may also be chilled or otherwise hardened.

Having thus described our invention,

We claim as new, and desire to secure by Letters Patent—

1. The screw A, in combination with the perforated nut F, fluted tube D, and the balls G, substantially as specified.

2. The combination of the screw A, perforated nut F, tube D, flanges I K, and balls L, substantially as specified.

3. The combination of the tube D, rods M, and bed N of the frame, all substantially as specified.

4. The combination of the screw A, nut F, tube D, balls G L, rods M, bed N, follower B, and the case, all substantially as specified.

CHRISTOPHER D. FINDLAY.
DAVID D. CRAIG.

Witnesses:
J. P. FLANDERS,
T. W. MANGHAM.